(12) United States Patent
Morita et al.

(10) Patent No.: US 8,221,001 B2
(45) Date of Patent: Jul. 17, 2012

(54) BEARING APPARATUS

(75) Inventors: Koichi Morita, Fujisawa (JP); Keisuke Yokoyama, Fujisawa (JP)

(73) Assignee: NSK Ltd., Tokyo (JP)

( * ) Notice: Subject to any disclaimer, the term of this patent is extended or adjusted under 35 U.S.C. 154(b) by 473 days.

(21) Appl. No.: 12/305,786

(22) PCT Filed: Mar. 13, 2007

(86) PCT No.: PCT/JP2007/054900
§ 371 (c)(1),
(2), (4) Date: Dec. 19, 2008

(87) PCT Pub. No.: WO2007/148454
PCT Pub. Date: Dec. 27, 2007

(65) Prior Publication Data
US 2010/0166352 A1 Jul. 1, 2010

(30) Foreign Application Priority Data
Jun. 23, 2006 (JP) .................. 2006-173272

(51) Int. Cl.
*F16C 33/66* (2006.01)
*F16C 41/00* (2006.01)
*H01C 3/04* (2006.01)

(52) U.S. Cl. ..................... 384/448; 338/22 R

(58) Field of Classification Search .................. 384/448; 374/185; 338/22 R
See application file for complete search history.

(56) References Cited

U.S. PATENT DOCUMENTS

| 5,831,512 A | * | 11/1998 | Wienand et al. | ............ 338/22 R |
| 2007/0195066 A1 | | 8/2007 | Bernitz et al. | |

FOREIGN PATENT DOCUMENTS

| DE | 10 2004 034185 B3 | 1/2006 |
| GB | 2109998 A * | 6/1983 |
| JP | 58-130502 A | 8/1983 |
| JP | 11-166549 A | 6/1999 |
| JP | 2003-278773 A | 10/2003 |
| JP | 2004-316707 A | 11/2004 |
| WO | WO 01/63132 A2 | 8/2001 |
| WO | WO 01/63132 A3 | 8/2001 |

* cited by examiner

*Primary Examiner* — Thomas R Hannon
(74) *Attorney, Agent, or Firm* — Miles & Stockbridge P.C.

(57) ABSTRACT

A bearing apparatus includes a rolling bearing (16) having an outer ring (16a), an inner ring (16b), and rolling elements (16c) disposed between the inner ring (16b) and the outer ring (16a), a temperature sensor (TS) for measuring an internal temperature of the rolling bearing and a lubrication unit (22). The lubrication unit supplies lubricating oil in a quantity corresponding to the temperature detected by the temperature sensor, to the rolling bearing. With this configuration, it is feasible to provide the bearing apparatus capable of ensuring a sufficiently long life under the condition of high-speed rotations. The bearing apparatus is suitable for use in a spindle for a machine tool.

8 Claims, 5 Drawing Sheets

BEARING APPARATUS

TECHNICAL FIELD OF THE INVENTION

The present invention relates a bearing apparatus suitable for use in a spindle of a machine tool, which is incorporated into a spindle support portion or the like of a machine tool which slides and rotates at a high speed as typified by, e.g., a lathe, a drilling machine, a boring machine, a milling machine, a grinding machine, a honing machine, a super finishing machine, a lapping machine, etc.

BACKGROUND ART

Normally, a rolling bearing for supporting the spindle is incorporated into the spindle of the machine tool exemplified above and generally involves using an angular contact ball bearing, a cylindrical roller bearing, or the like in combination. Herein, accuracy of finishing and productivity of the machine tool depend largely on a rotational speed of the spindle, and the rotations of the spindle must be speeded up in order to enhance the productivity. If the rolling bearing is employed under the high-speed rotations, however, heat generation of the bearing remarkably rises, and a contact pressure between a rolling element and inner/outer rings increases due to centrifugal force. Hence, a condition of using the spindle gets remarkably deteriorated, and resultantly there increases a possibility of damaging the bearing as typified by abrasion, seizing, or the like. Further, the heat generation rises due to the high-speed rotations, and hence there is a possibility that thermal deformation of the machine tool might occur, which also affects the accuracy of finishing.

For preventing the critical inconvenience from occurring in the bearing and for avoiding the decrease in the accuracy of finishing due to the thermal deformation of the whole machine tool, the heat generation in the rolling bearing for supporting the spindle must be restrained to the greatest possible degree by selecting a proper lubrication system under the high-speed rotations. By contrast, the lubrication of the rolling bearing for supporting the spindle of the machine tool rotating at the high speed acquires a cooling effect that accompanies the supply of the lubricating oil, and therefore involves adopting an oil-air lubrication method, a nozzle jet lubrication method and an under-race lubrication method (refer to Japanese Patent Laid-Open Publication No. 2003-278773).

DISCLOSURE OF THE INVENTION

As exemplified in Japanese Patent Laid-Open Publication No. 2003-278773, however, though there is a conventional technology of focusing on a quantity of the lubricating oil, there is none of a technology aiming at properly supplying an adequate quantity of lubricating oil while focusing on an actual temperature of the bearing. The conventional technology described above is hard to properly supply the adequate quantity of lubricating oil in a way that directly measures the temperature of the bearing under the operation.

It is an object of the present invention, which was devised in view of the problems inherent in the prior art described above, to provide a bearing apparatus contrived to enhance reliability by supplying a necessary quantity of lubricating oil.

A bearing apparatus according to the present invention comprises a rolling bearing having an outer ring, an inner ring, and rolling elements disposed between the inner ring and the outer ring, a temperature sensor for measuring an internal temperature of the rolling bearing, and a lubrication unit, wherein the lubrication unit supplies lubricating oil in a quantity corresponding to the temperature detected by the temperature sensor, to the rolling bearing.

According to the present invention, the lubrication unit supplies the lubricating oil in a quantity corresponding to the temperature detected by the temperature sensor, to the rolling bearing, and therefore, the adequate quantity of lubricating oil is properly supplied to the rolling bearing by directly measuring the internal temperature of the rolling bearing at high accuracy, whereby the bearing apparatus capable of ensuring a sufficiently long life under a condition of high-speed rotations can be provided.

It is preferable that the temperature sensor is constructed by exposing by light a resist coated over a surface of a substrate with use of a mask to a fine pattern and developing the fine pattern thereon, depositing a metal film onto the fine pattern by sputtering, and thereafter removing a residual resist. This type of temperature sensor can be manufactured as an extremely thin sensor and therefore does not require a large fitting space. The temperature sensor can be therefore fitted in an optional position in an interior of the bearing apparatus and can measure a temperature of an originally-want-to-measure portion at the high accuracy.

It is preferable that the bearing apparatus is used in a spindle for a machine tool.

BEST MODE FOR CARRYING OUT THE INVENTION

Figure 1:
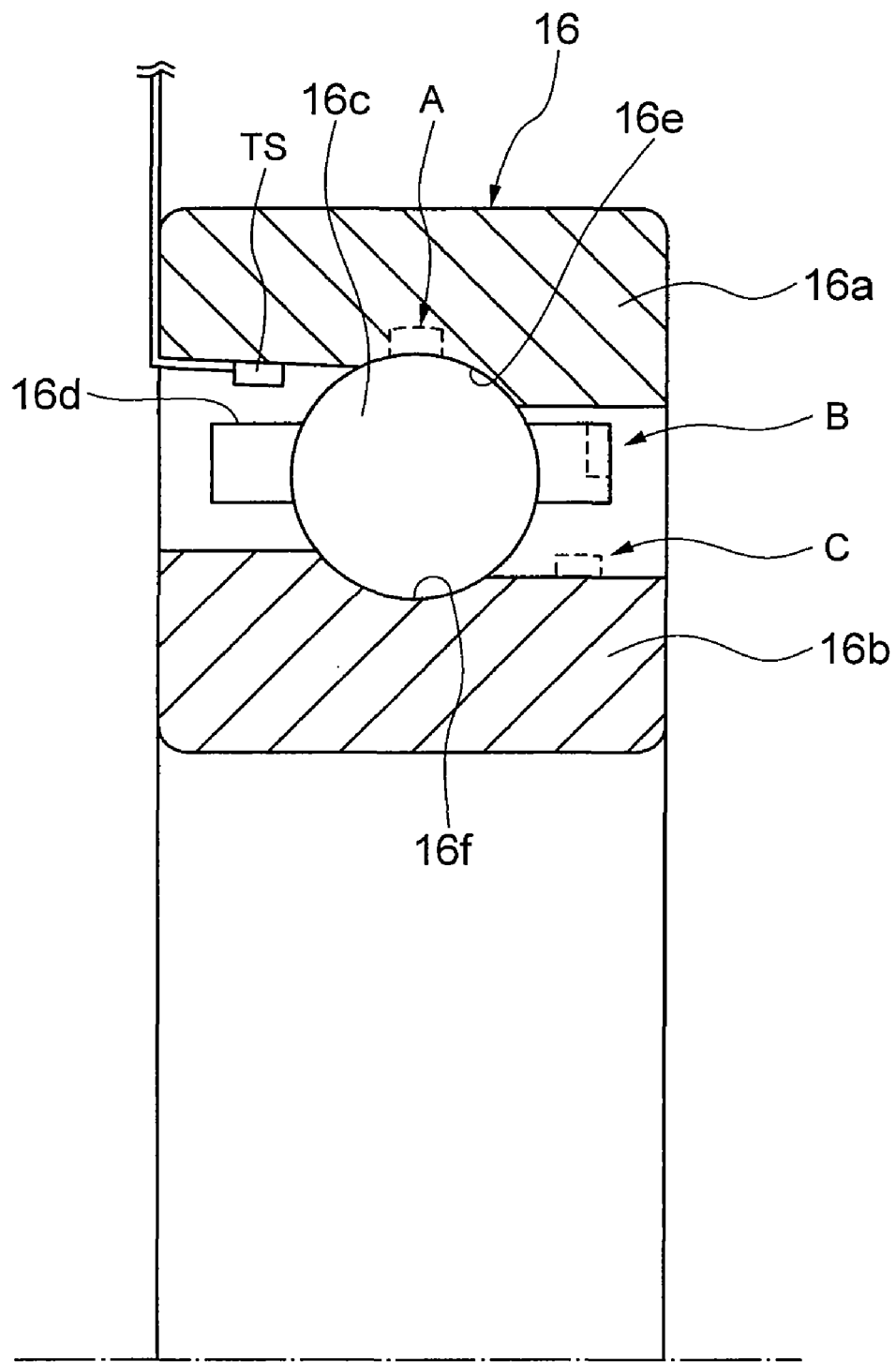
FIG. 1 is a sectional view showing a sectional view taken in a direction of an axis line of a rolling apparatus according to an embodiment.

Next, an embodiment of the present invention will be described with reference to the drawings. FIG. 1 is a sectional view taken in a direction of an axis line of a rolling bearing used in the present embodiment. A rolling bearing (angular contact ball bearing) 16 includes an outer ring 16a, an inner ring 16b, balls 16c serving as rolling element disposed between the two rings 16a, 16b and a retainer 16d which retains the balls 16c at equal intervals in a peripheral direction. The outer ring 16a has a raceway surface 16e along its inner periphery. The inner ring 16b has a raceway surface 16f along its outer periphery. The ball 16c may be composed of ceramic such as silicon nitride, silicon carbide, or the like.

A temperature sensor TS is bonded by a bonding agent to an inner peripheral surface, other than the raceway surface 16e, of the outer ring 16a. A wire extending from the temperature sensor TS is drawn out to the exterior through an end surface from the inner peripheral surface of the outer ring 16a. Note that FIG. 1 illustrates in exaggeration a thickness of the temperature sensor TS.

Figure 2:
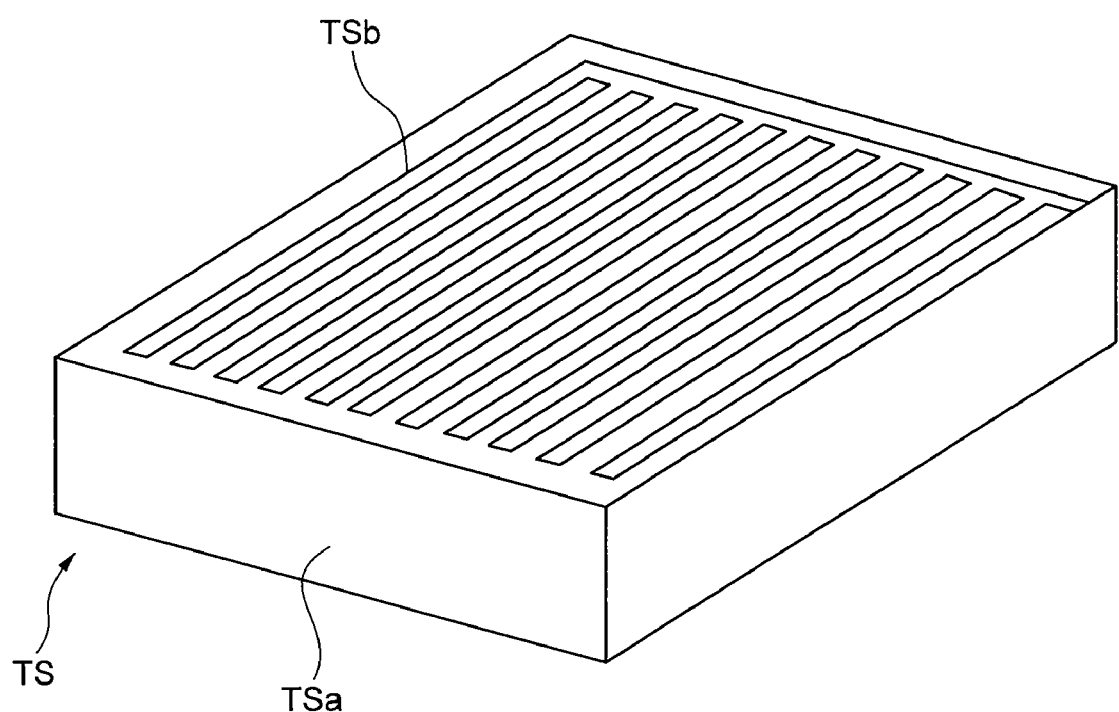
FIG. 2 is a perspective view showing a temperature sensor TS in enlargement.

FIG. 2 is an enlarged perspective view of the temperature sensor TS. Referring to FIG. 2, the temperature sensor TS includes a substrate TSa and a fine resistance pattern TSb formed on the substrate TSa. The resistance pattern TSb consists of one single platinum line having a narrow line width, and varies in its resistance value depending on a temperature as a total length thereof changes due to an expansion or contraction of the substrate TSa, thereby to measure the temperature by applying an electric current to the resistance pattern TSb.

A manufacturing method of the temperature sensor TS will be described. A photo resist (OFPR800LB made by Tokyo Ohka Kogyo Co., Ltd.), which is approximately 2 μm in thickness, is coated by spin coating over the surface of the silicon substrate (thickness: 200 μm) attached with an oxide film serving as an insulating film and undergoes a pre-baking process at 90° C. for 8 min. Thereafter, the resistance pattern TSb is exposed to the light by use of a mask corresponding to this resistance pattern TSb (by use of a mask aligner EMA-400 made by Union Optical Co., Ltd.) and developed by employing a developing solution (MND 3 made by Tokyo Ohka Kogyo Co. Ltd.). This substrate is finally rinsed in super-pure water for 60 sec.

Thereafter, a platinum film, which is approximate 250 nm in thickness, is deposited on the photo resist by the sputtering method, and the photo resist residual on the substrate is removed by use of a lift-off method employing acetone. After this process, the substrate is cut by a dicing apparatus to a predetermined chip size. The platinum resistance pattern TSb on the chip undergoes wiring. The manufacturing method of the temperature sensor TS is, though not limited to the method described above, excellent in terms of mass productivity, downsizing and reaction of the sensor, which accompanies the downsizing, by use of a semiconductor micronization technology.

Figure 3:
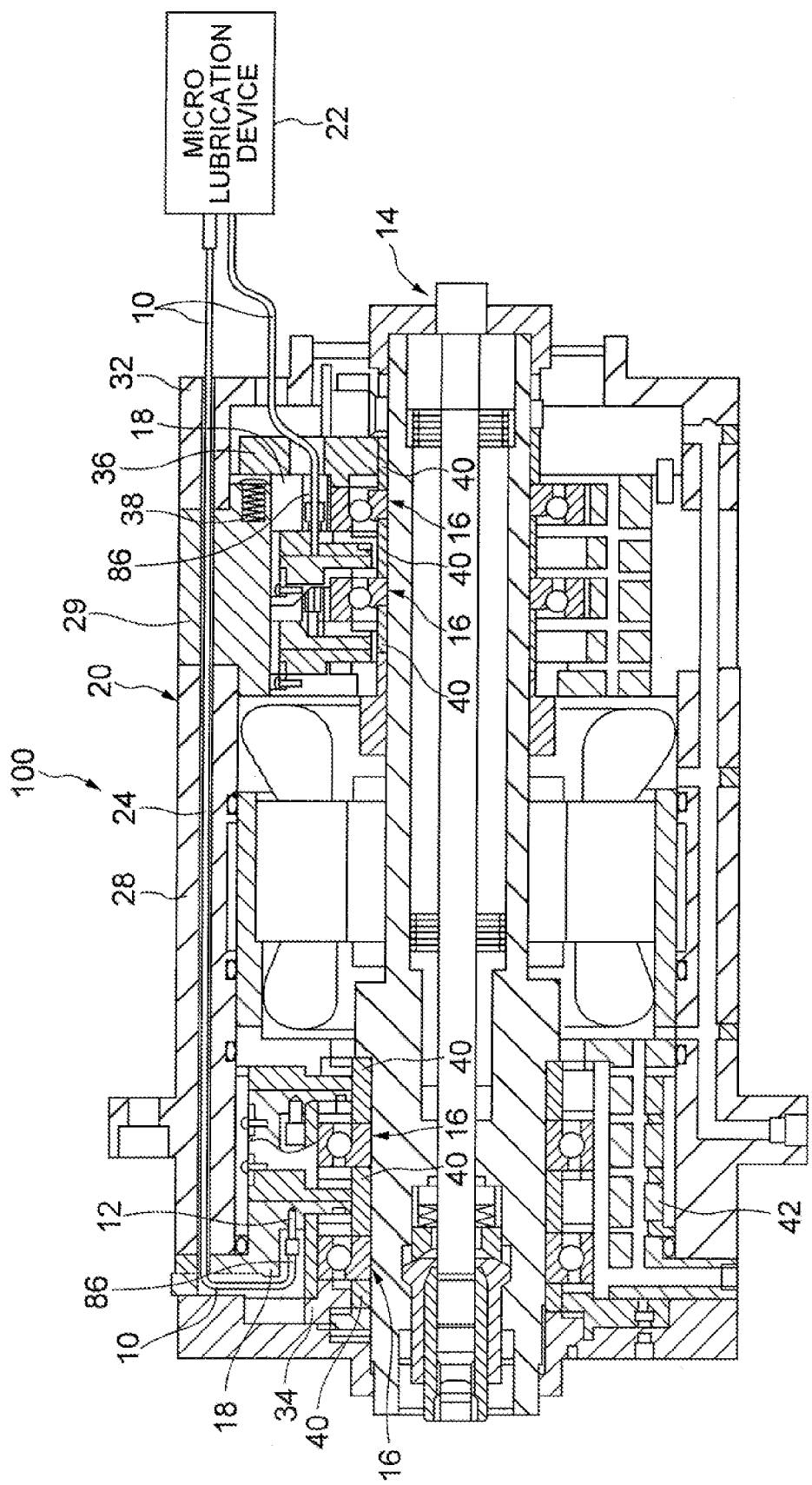
FIG. 3 is a sectional view of a spindle apparatus for a machine tool, into which the rolling bearing illustrated in FIG. 1 is incorporated.

FIG. 3 is a sectional view of a spindle apparatus for a machine tool, into which the rolling bearing illustrated in FIG. 1 is incorporated. A spindle apparatus 100 is an apparatus for the machine tool adopting a jacket structure which lets a cooling oil flow to an external housing. The spindle apparatus 100 takes a structure that a pressure-withstanding tube 10 of stainless steel, which is φ1 mm to φ3.2 mm (herein, φ1.6 mm is given as an outside diameter, and φ1.0 mm is given as an inside diameter by way of one example) in diameter to exhibit flexibility against a flexure, is extended round within the spindle apparatus 100 and is connected to a nozzle head 12. The pressure-withstanding tube 10 of stainless steel is a tube which is subjected to a luster annealing treatment, and is flexible, hence, easy to bend by hand. Also, the tube expansion by the pressure is small, and the tube is suited to supplying a minute quantity of lubricating oil.

The spindle apparatus 100 includes a spindle shaft 14, a plurality of rolling bearings 16 (four pieces of bearings 16 are provided in the illustrative example) rotatably supporting the spindle shaft, an internal housing 18 covering the exterior of the rolling bearings 16, and an external housing 20 covering the exterior of the spindle apparatus 100. A lubrication unit 22 defined as a lubricating oil supply source is connected to the nozzle head 12 disposed within the internal housing 18 via the pressure-withstanding tube 10, through a lubricating oil supply communicating hole 24 formed along the axial direction within the external housing 20 and through an aperture portion 86 formed in the internal housing 18. Namely, the nozzle head 12 is a nozzle member for intermittently jetting the minute quantity of lubricating oil directly to the rolling bearing 16. Then, the pressure-withstanding tube 10 is the tube for leading the lubricating oil jetted by the lubrication unit 22 to the nozzle head 12.

The external housing 20 is constructed of outer cylinders 28, 29 embracing the outer periphery of the internal housing 18, and a rear cover 32 fixed to the end surface of the outer cylinder 29. The rolling bearings 16 are made two couples and are disposed at predetermined intervals in the axial direction so as to support the front side and the rear side of the spindle shaft 14 in a way that each couple takes partial charge of the support area. An outside diametrical face of the outer ring of the respective rolling bearings 16 is tightly fixedly fitted to the inner peripheral surface of the internal housing 18. The outer ring of the rolling bearings 16 in the foremost portion abuts on and thus engages with an outer ring pressing member 34 in a rotation-disabled status. The outer ring of the rolling bearings 16 in the rearmost portion engages with the outer cylinder 28 in the rotation-disabled status via an outer ring pressing member 36 while being elastically biased by a spring 38 in the axial direction. Further, an inside diametrical face of the inner ring of the respective rolling bearings 16 is fixedly fitted to the outer peripheral surface of the spindle shaft 14, and spacers 40 for fixing the rolling bearings 16 in the axial direction are provided between the individual rolling bearings 16 in the front side and the rear side, respectively.

Further, as illustrated in the drawings, a cooling groove 42 is formed in the outside diametrical portion of the internal housing 18, and a cooling oil supplied from an unillustrated cooling unit is circulated along the cooling groove 42, thereby cooling the external housing 20. Namely, the spindle apparatus 100 is configured to have the cooling function based on an outer cylinder cooling system. Note that the spindle shaft 14 is horizontally sustained in the present embodiment, however, if used for, e.g., the machining center, the spindle shaft 14 might be employed while being set vertical or oblique.

Figure 4:
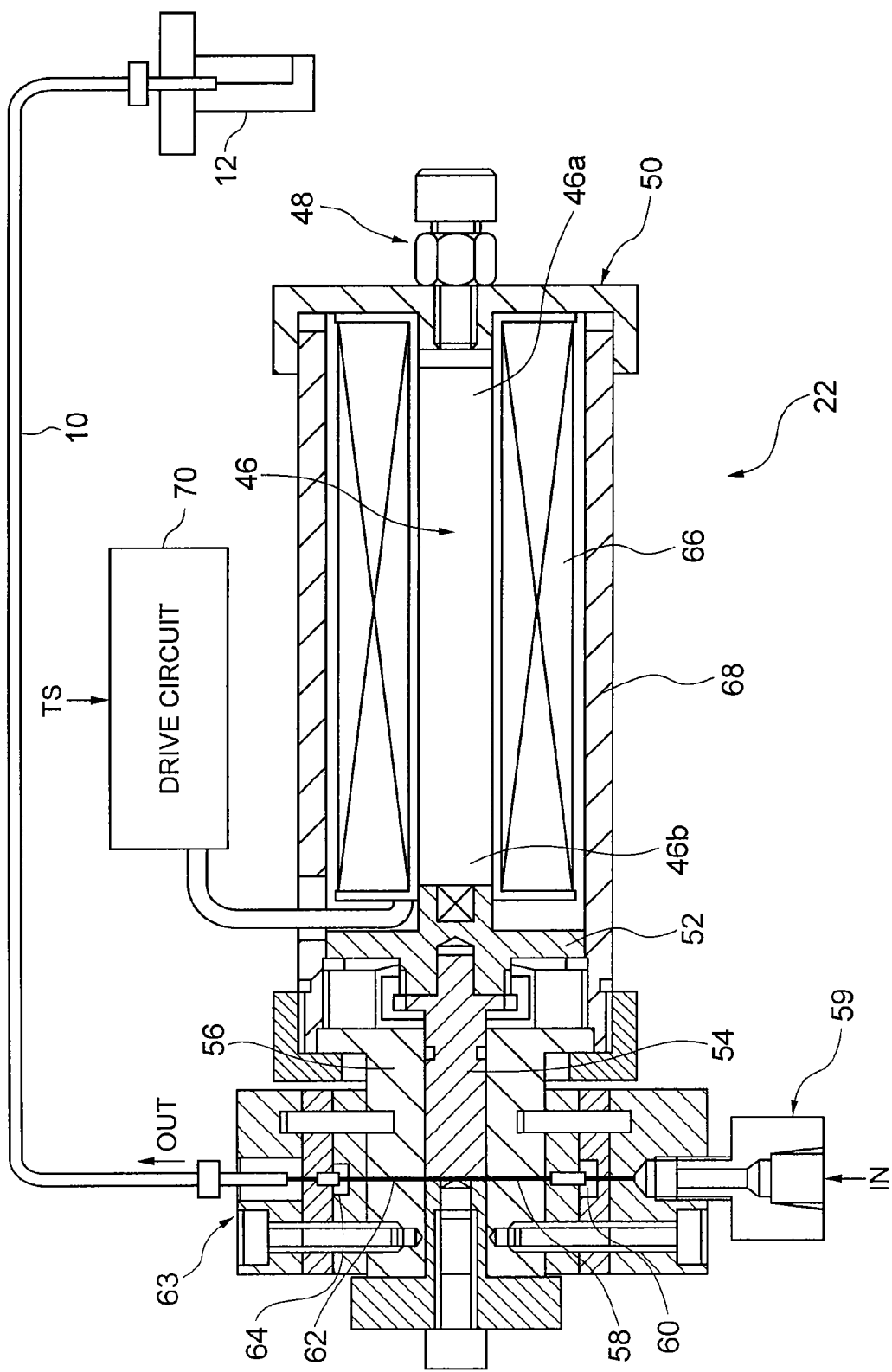
FIG. 4 is a view showing a configuration of a lubrication unit 22.

Next, the lubrication unit 22 will be explained. FIG. 4 is view showing a configuration of the lubrication unit 22. As illustrated in FIG. 4, the lubrication unit 22 includes a rod member 46 composed of a super magnetostrictor having a positive property, in which one end portion 46a of the rod member 46 in the axial direction is fixed to a case 50 through a preload adjusting mechanism 48. The rod member 46 stretches in the direction of the axis line by dint of a magnetostrictive phenomenon (Joule effect) when a magnetic field is applied.

The preload adjusting mechanism 48 can involve using, e.g., s screw mechanism that protrudes in the direction of the axis line of the rod member 46 through rotations and enables one end portion 46a of the rod member 46 to be pressed. A pressure transmitting member 52 for transmitting the pressure without causing any gap (play) in the axial direction of the rod member 46 by biasing the rod member 46 toward the preload adjusting mechanism 48, is disposed at the other end portion 46b of the rod member 46 in the direction of the axis line. The rod member 46 is connected to a piston 54 through the pressure transmitting member 52. The piston 54 is disposed slidably in an interior of a cylinder 56, and a pump chamber is constructed of the cylinder 56 and the piston 54.

The cylinder 56 is provided with an intake flow path 58 for supplying the lubricating oil to the pump chamber. An intake-side check valve 60 constructed of a check valve for preventing an outflow of the lubricating oil from the pump chamber is provided partway along the flow path leading to an intake port 59 of the intake flow path 58. Further, the cylinder 56 is provided with a discharge flow path 62 for discharging the lubricating oil discharged from the pump chamber. A discharge-side check valve 64 constructed of the check valve for preventing the lubricating oil from being introduced into the pump chamber, is provided partway along the flow path leading to a discharge port 63 of the discharge flow path 62.

A coil 66 is coaxially provided around the outer periphery of the rod member 46, and further a yoke 68 composed of a magnetic material, which makes a magnetic circuit with the rod member 46, is provided outside of the coil 66. Moreover, a drive circuit 70 is electrically connected to the coil 66. The drive circuit 70 receives a signal corresponding to the temperature measured by the temperature sensor TS, and outputs the electric current for generating the magnetic field corresponding thereto. The electric current is applied to the coil 66, whereby the rod member 46 receives the magnetic field generated from the coil 66 and thus stretches, with the result that the lubricating oil supplied through the intake flow path 58 and staying in the pump chamber is discharged from a discharge port 63 through the discharge flow path 62. The discharged lubricating oil is discharged from the nozzle head 12 through the pressure-withstanding tube 10. At this time, a discharge quantity per shot is as small as 0.5 to 10 mm$^3$, and the lubricating oil is intermittently discharged under a discharge pressure of 1 MPa or above.

Figure 5:
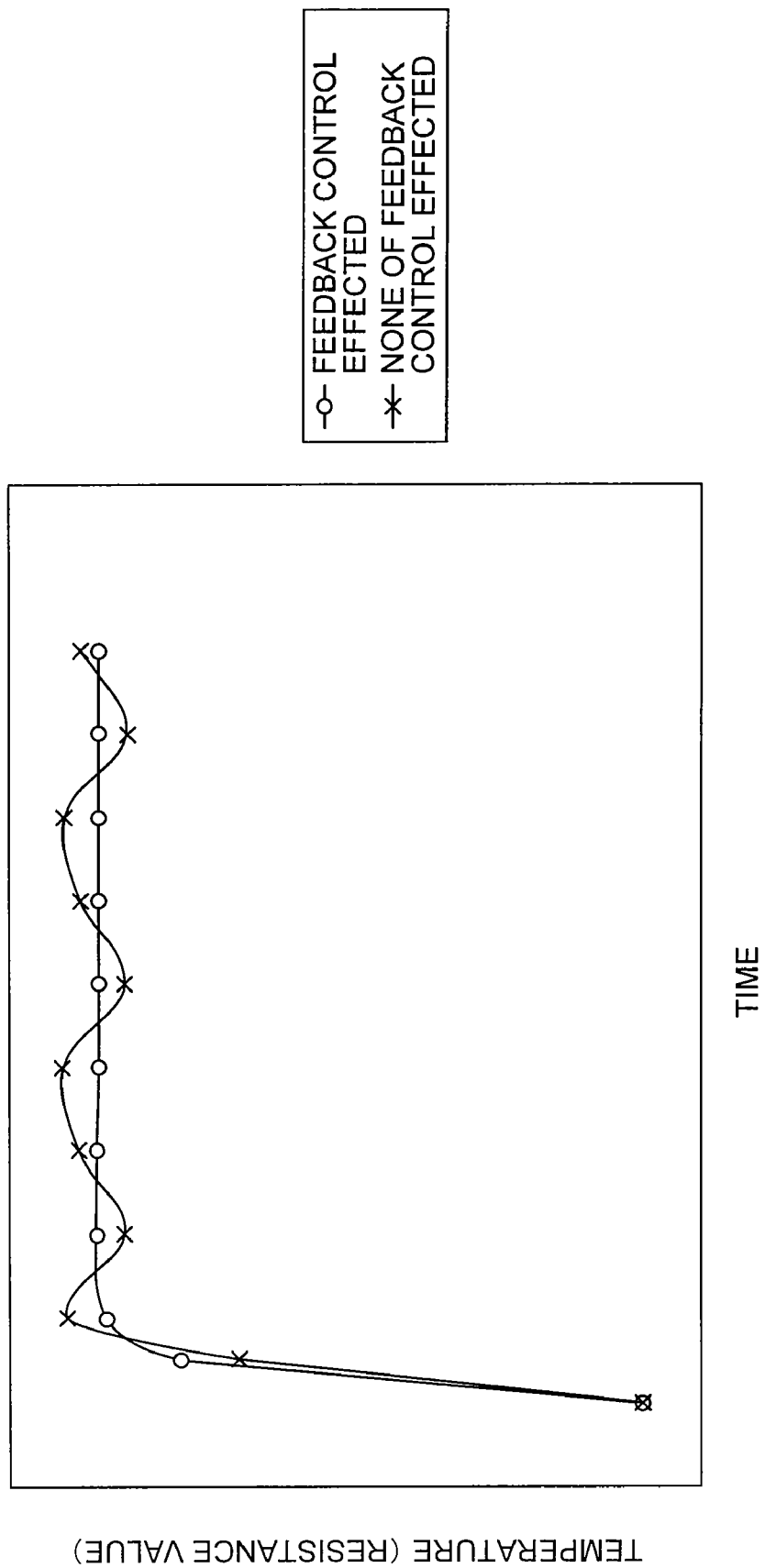
FIG. 5 is a diagram showing a result of simulating a rise in temperature of the rolling bearing when operating the spindle apparatus for the machine tool.

The present inventors simulated a change in the temperature of the rolling bearing 16 in the case (feedback control effected) that the rolling bearing 16 with the temperature sensor TS manufactured by the method described above being fitted to the raceway surface 16e of the outer ring 16a, is assembled to the spindle apparatus illustrated in FIG. 3, and the lubricating oil is supplied in the way of adjusting the quantity of the lubricating oil of the lubrication unit 22 on the basis of a result of the temperature measurement by the temperature sensor TS, and in the case (none of the feedback control effected) that the lubricating oil of the lubrication unit 22 is intermittently supplied irrespective of the temperature. FIG. 5 shows the result of simulating the change in the temperature in a state of making rotations at 20,000 rpm for one hour at an ambient temperature of 25° C. In the case of intermittently supplying the lubricating oil of the lubrication unit 22, a fixed quantity of lubricating oil is supplied at the fixed time intervals, and consequently such a problem arises that the bearing temperature is hard to stabilize. By contrast, in the case of measuring the temperature information in real time by the temperature sensor TS and supplying the lubricating oil from the lubrication unit 22 in a way that controls the supply timing and the supply quantity of the lubricating oil based on the measured temperature information, it is understood that the bearing temperature is highly stabilized.

The present invention has been discussed so far by way of the embodiment but should not be construed in the way of being limited to the embodiment described above, and can be, as a matter of course, properly modified and improved. For example, the temperature sensor TS may be, as depicted by dotted lines, disposed on the raceway surface 16e (portion A) of the outer ring 16a, the retainer 16d (portion B) and the inner ring 16b (portion C). The temperature sensor, of which the fitting portion is not limited to those given above, can be fitted to whichever portion of the rolling bearing 16. The information from the temperature sensor TS is received and transferred to the drive circuit 70 wirelessly (IC tag, or the like) without being limited to the wired means and is analyzed, whereby an adequate quantity of lubricating oil can be supplied from the lubrication unit 22. Further, the temperature sensor TS may also be constructed of a thermocouple type of sensor composed of a dissimilar metal thin film.

INDUSTRIAL APPLICABILITY

As described above, the bearing apparatus according to the present invention is useful because of properly supplying the adequate quantity of lubricating oil to the rolling bearing and enabling a sufficiently long life to be ensured even under the condition of the high-speed rotations, and is suitable for the use of the spindle for the machine tool.

What is claimed is:

1. A bearing apparatus comprising:
    a rolling bearing having an outer ring, an inner ring, and rolling elements disposed between said inner ring and said outer ring;
    a temperature sensor for measuring an internal temperature of said rolling bearing; and
    a lubrication unit,
    wherein said temperature sensor comprises a silicon substrate cut to a predetermined size and having an attached insulating oxide film, and a sputtered platinum resistance pattern on the insulating oxide film, and
    wherein said lubrication unit supplies lubricating oil in a quantity corresponding to the temperature detected by said temperature sensor, to said rolling bearing.

2. A bearing apparatus according to claim 1, wherein said temperature sensor is disposed on a raceway surface, or a portion of the outer ring or the inner ring vicinal to the raceway surface, or a retainer for retaining said rolling elements.

3. A bearing apparatus according to claim 1, wherein said lubrication unit controls supply timing and a supply quantity of the lubricating oil substantially in real time based on the temperature detected by said temperature sensor.

4. A bearing apparatus according to claim 1, wherein said bearing apparatus is used in a spindle for a machine tool.

5. A bearing apparatus according to claim 1, wherein said temperature sensor is disposed on a raceway surface of the outer ring.

6. A bearing apparatus according to claim 1, wherein the substrate has a thickness of about 200 μm.

7. A bearing apparatus according to claim 6, wherein the platinum resistance pattern has a thickness of about 250 nm.

8. A bearing apparatus according to claim 1, wherein the temperature sensor is disposed on a portion of one of the outer ring and inner ring vicinal to a raceway surface of the one ring.

* * * * *